(12) United States Patent
Talke et al.

(10) Patent No.: US 11,049,410 B2
(45) Date of Patent: Jun. 29, 2021

(54) DEVICE AND METHOD FOR REPLICATING WAVE MOTION

(71) Applicant: The United States of America, as represented by the Secretary of the Navy, San Diego, CA (US)

(72) Inventors: Kurt A Talke, San Diego, CA (US); Nicholas C Stroumtsos, San Diego, CA (US); Dylan T. J. Drotman, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 353 days.

(21) Appl. No.: 15/998,802

(22) Filed: Aug. 15, 2018

(65) Prior Publication Data
US 2020/0058228 A1 Feb. 20, 2020

(51) Int. Cl.
*B25J 9/16* (2006.01)
*G09B 9/12* (2006.01)
*G09B 9/08* (2006.01)

(52) U.S. Cl.
CPC ............ *G09B 9/12* (2013.01); *G09B 9/085* (2013.01); *B25J 9/1623* (2013.01)

(58) Field of Classification Search
CPC .. G09B 9/12; G09B 9/085; A47K 3/10; E04H 4/0006; E04H 4/00; F04D 35/00; E02B 9/08; A61B 2034/304; A61H 2201/1661; B25J 17/0216; B25J 9/1623; G05B 2219/39078; G05B 2219/50162; G05B 2219/39552; G05B 2219/50169; G05B 2219/40244; G05B 2219/40277; G05B 2219/39565; G05B 2219/40524
(Continued)

(56) References Cited

U.S. PATENT DOCUMENTS 5,255,571 A * 10/1993 Smith .................... B25J 9/1612
                                                                     74/490.06
5,401,128 A     3/1995 Lindem et al.
(Continued)

OTHER PUBLICATIONS

"Spatial intelligence follow air-floated platform, has mounting platform floating right above supporting platform by high pressure gas, where opposite surfaces of supporting and mounting platforms are equipped with position sensors"; Derwent, Acc-No. 2011-B63593, Week 201273; Priority date Aug. 19, 2010. (Year: 2010).*
(Continued)

*Primary Examiner* — Robert P Bullington
*Assistant Examiner* — Stephen Alvesteffer
(74) *Attorney, Agent, or Firm* — Naval Information Warfare Center, Pacific; Kyle Eppele; J. Eric Anderson

(57) ABSTRACT

A device includes a frame having a plurality of rails, each rail including a slider. A first rail support member is connected to a first end of the plurality of rails, and a second rail support member is connected to a second end of the plurality of rails. The second end is opposite the first end. A plurality of arms is connected to the sliders. Each arm includes a ball joint at one end connected to one of the sliders. Each arm includes another end, opposite the one end, connected to a platform via a hinge joint. The platform is configured to roll and pitch via changing positions of the sliders along the plurality of rails.

17 Claims, 8 Drawing Sheets

(58) Field of Classification Search
USPC .......................................................... 434/126
See application file for complete search history.

(56) References Cited

U.S. PATENT DOCUMENTS

| | | | | |
|---|---|---|---|---|
| 5,960,672 | A * | 10/1999 | Pritschow | B23Q 1/5462 74/490.03 |
| 6,196,081 | B1 | 3/2001 | Yau | |
| 6,307,285 | B1 | 10/2001 | Delson et al. | |
| 6,581,437 | B2 * | 6/2003 | Chrystall | A43D 999/00 73/7 |
| 7,033,176 | B2 | 4/2006 | Feldman et al. | |
| 8,967,015 | B2 * | 3/2015 | Monti | B25J 17/0266 74/490.01 |
| 9,803,800 | B2 * | 10/2017 | Hwang | F16M 13/022 |
| 2002/0015624 | A1 * | 2/2002 | Wang | B25J 9/0072 409/201 |
| 2003/0005786 | A1 * | 1/2003 | Stuart | B23Q 1/5462 74/479.01 |
| 2004/0082284 | A1 * | 4/2004 | Lutz | B23Q 1/5462 451/353 |
| 2013/0212812 | A1 | 8/2013 | Van Der Tempel et al. | |
| 2015/0176754 | A1 * | 6/2015 | Houston | B25J 9/0009 248/125.2 |
| 2017/0221376 | A1 * | 8/2017 | Gosselin | B25J 17/0266 |
| 2018/0096622 | A1 * | 4/2018 | Glover | G09B 9/048 |

OTHER PUBLICATIONS

Dasgupta, Bhaskar. "The Stewart Platform Manipulator: A Review," Mechanism and Machine Theory 35, 2000.

* cited by examiner

300

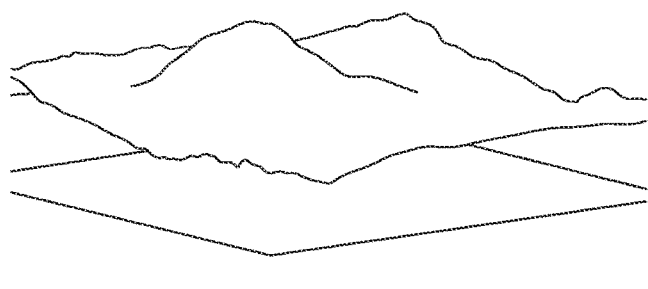
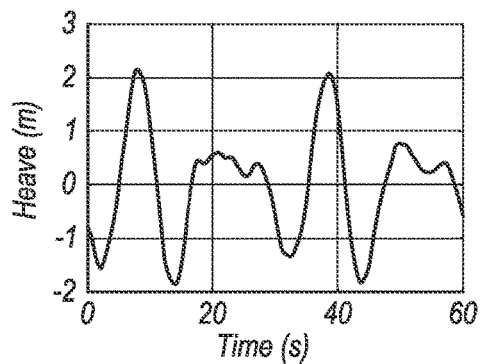
FIG. 7A
FIG. 7B
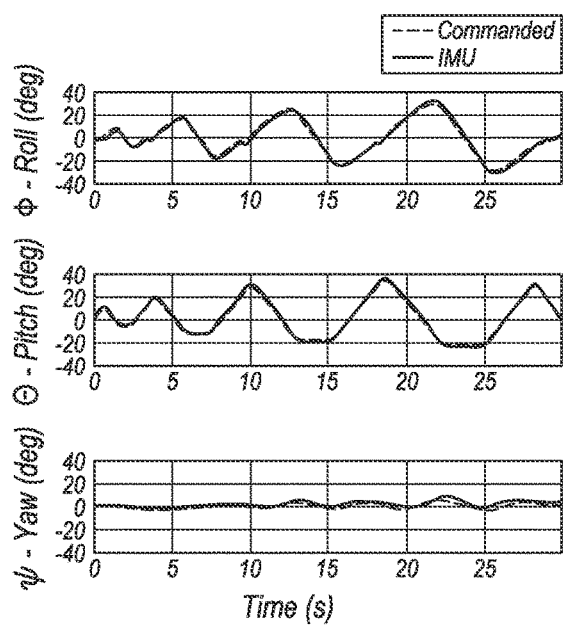
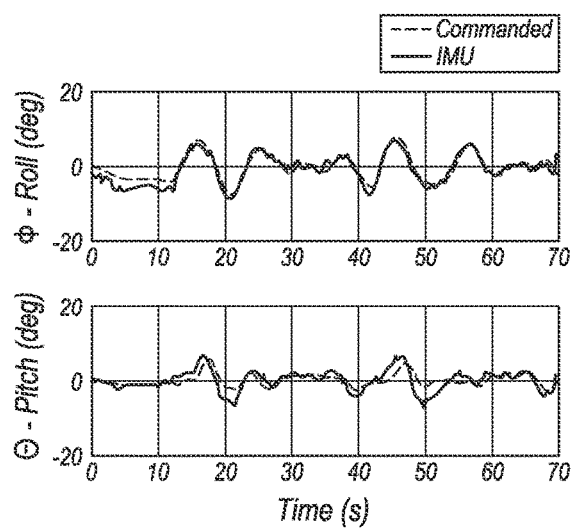
FIG. 8
FIG. 9

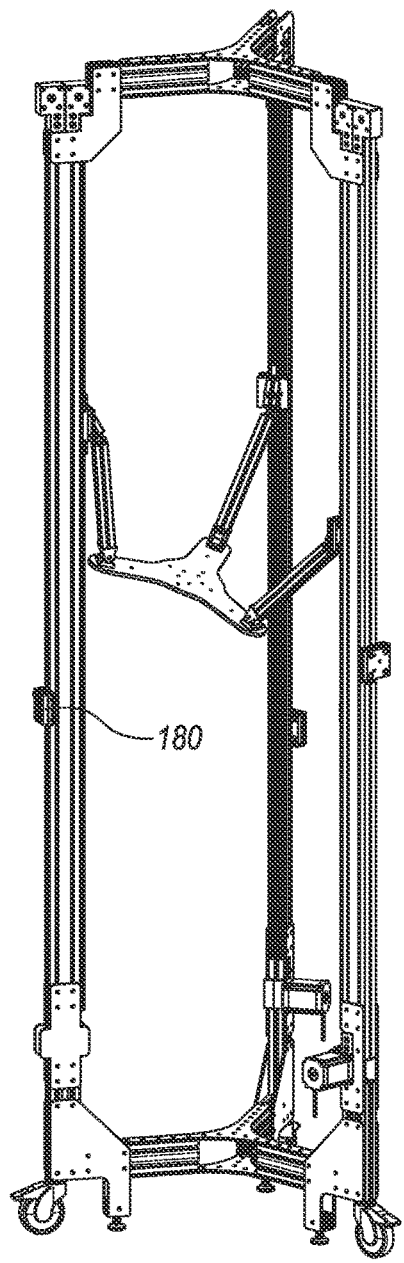
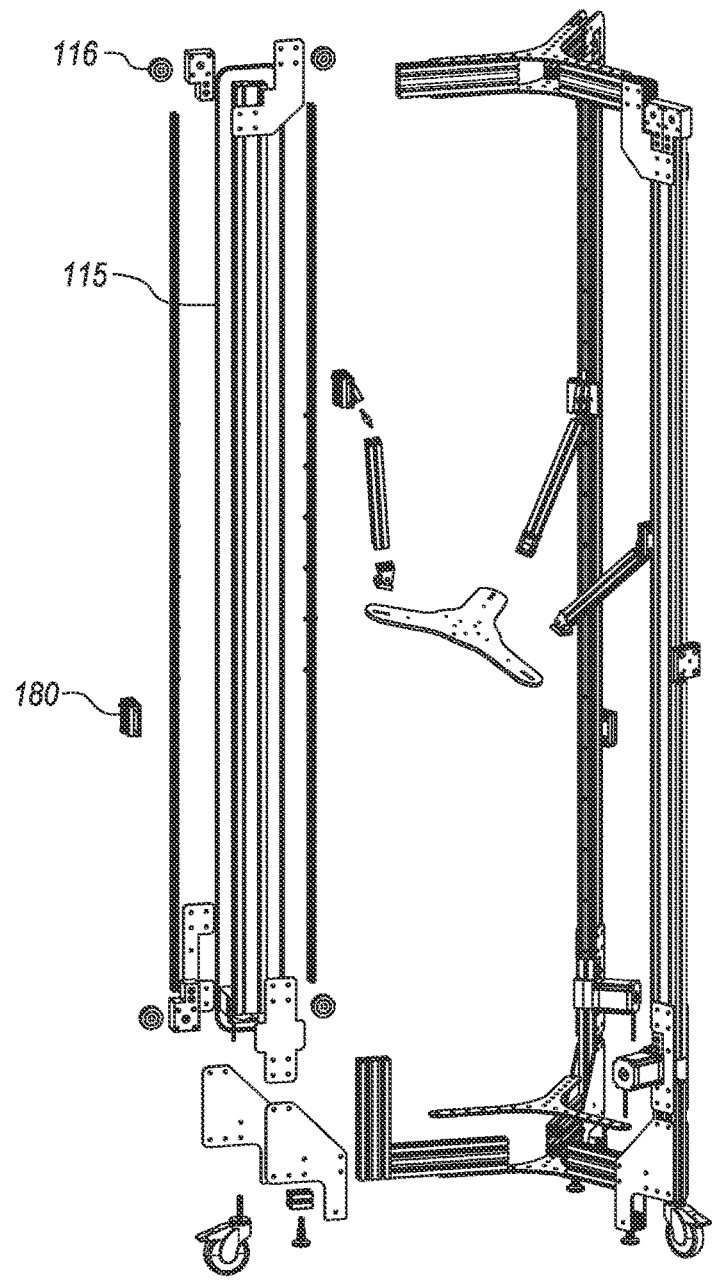
FIG. 10A
FIG. 10B

DEVICE AND METHOD FOR REPLICATING WAVE MOTION

FEDERALLY-SPONSORED RESEARCH AND DEVELOPMENT

The United States Government has ownership rights in the subject matter of the present disclosure. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Reference Navy Case 108258.

BACKGROUND

Tethered flight from a ship has traditionally been accomplished using a taut tether to avoid problems with entanglement, oscillation, tether dynamics, etc. The scenario of an unmanned air vehicle (UAV) tethered to a small unmanned surface vehicle (USV) flying on a semi-slack tether presents challenges due to the ocean dynamics affecting the control of the tether management system. In order to develop a winch-based system to manage dynamics and oscillations of a semi-slack tether, a repeatable testing environment is desirable. A need exists to develop a testing platform capable of replicating wave motion. Relying on weather conditions to test in specific sea states is costly, time limiting, and potentially dangerous.

Data from numerical models can be used as an input for a physical wave simulator. Stewart platforms have been used in various applications as six degree-of-freedom simulators; however, the design requirements and expense of a Stewart platform limit its effectiveness in certain applications (e.g., the coordinated UAV-USV scenario) where larger actuators are necessary to achieve a desired range for certain degrees-of-freedom.

SUMMARY

The present disclosure describes a device and method for replicating wave motion. According to an illustrative embodiment, a device is provided that includes: a frame comprising a plurality of rails, each rail including a slider; a first rail support member connected to a first end of the plurality of rails; and a second rail support member connected to a second end of the plurality of rails, wherein the second end is opposite the first end. A plurality of arms is connected to the sliders. Each arm including a ball joint at one end connected to one of the sliders. Each arm includes another end opposite the one end and connected to a platform via a hinge joint. The platform is configured to roll and pitch via changing positions of the sliders along the plurality of rails.

BRIEF DESCRIPTION OF THE DRAWINGS

Features of illustrative embodiments will be best understood from the accompanying drawings, taken in conjunction with the accompanying description, in which similarly-referenced characters refer to similarly-referenced parts. The elements in the drawings may not be drawn to scale. Some elements and/or dimensions may be enlarged or minimized, as appropriate, to provide or reduce emphasis and/or further detail.

FIGS. 7A & 7B show a numerical wave simulator and a specified heave profile in keeping with an embodiment.

FIG. 8 shows the experimental test results from the boundary level set path through the ball joint constrained configuration space.

FIG. 9 shows experimental test results using numerical wave data.

FIG. 10A illustrates another embodiment of the device, and FIG. 10B illustrates the device of FIG. 10A with a portion of the device in an exploded view.

DETAILED DESCRIPTION OF VARIOUS EMBODIMENTS

Figure 1:
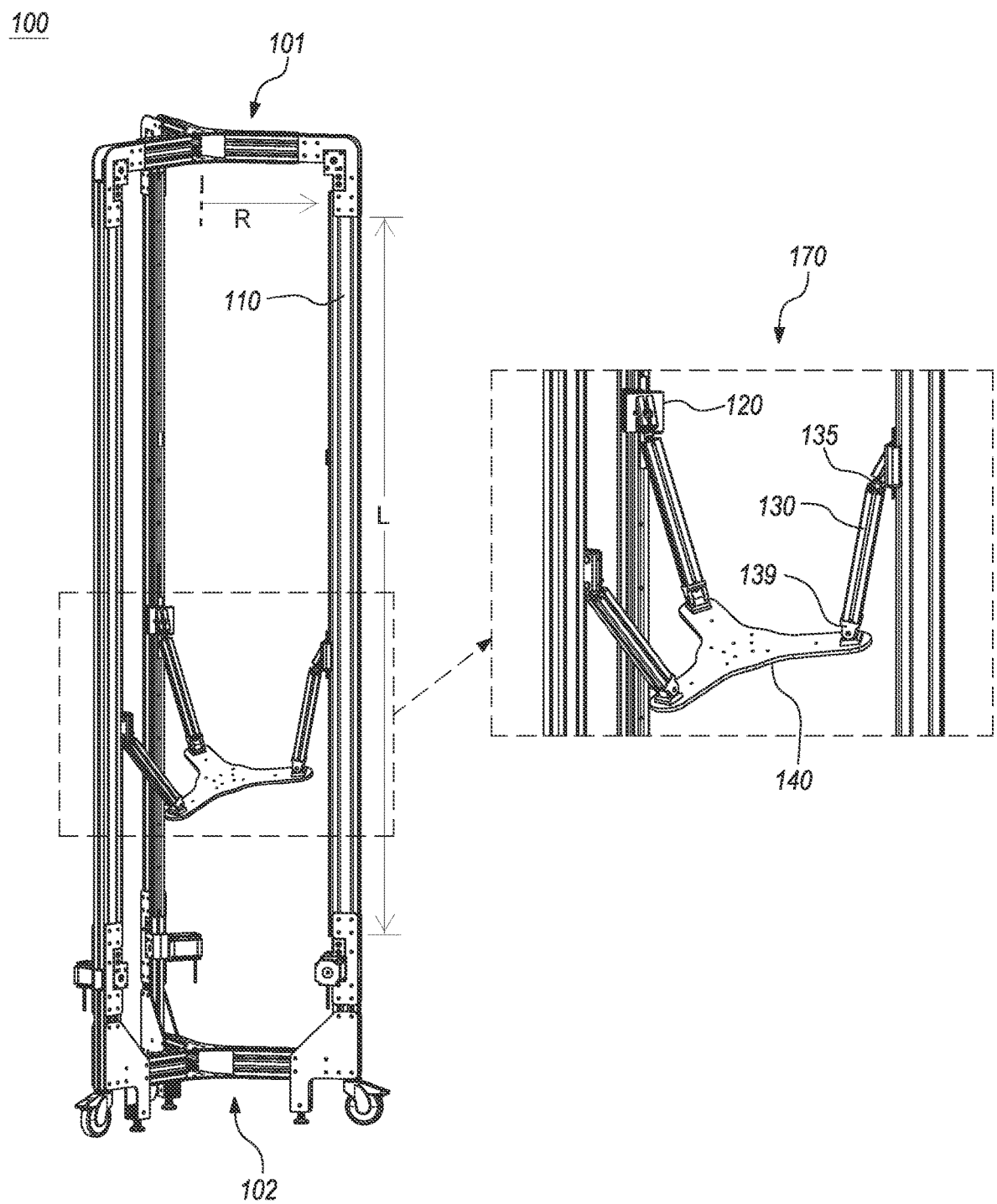
FIG. 1 illustrates an embodiment of a device (a three degree-of-freedom mechanism) for replicating wave motion.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a device, a three degree-of-freedom (3DOF) mechanism, suitable for simulating wave motion and a method of use thereof. A 3DOF mechanism is a device that may be used to replicate ocean waves up to and including sea state four (1.25-2.5 meters, and a 5-15 second time period) for testing a tethered UAV-USV system. The 3DOF mechanism can also replicate motion of a vessel on the surface of the ocean. Land-based testing using such a device may reduce costs and the design iteration cycle time.

The 3DOF mechanism may have three controllable degrees-of-freedom (e.g., heave, roll, and pitch). Large displacement in the z-axis direction may require three vertical rails with actuated sliders, which act as prismatic joints. The sliders may be respectively attached to three arms through spherical ("ball") joints. The arms then connect to a platform through revolute ("hinge") joints. The platform may be large enough to carry a winch system and may roll and pitch at any height along the vertical rails by changing the relative slider heights according to a roll-pitch configuration space.

The 3DOF mechanism may allow for the ability to scale for larger wave heights by extending the vertical rails, as well as scaling for larger payloads by increasing the radius of the device (which may include increasing the size of the platform). This design may be used in, but is not limited to, applications where heave is a major component of the required motion (e.g., at least an order of magnitude greater than other motion components) without the added complexity and cost of designing a Stewart platform.

Grubler-Kutzbach's equation, Eq. (1), may be used to define the degrees-of-freedom, or mobility of the mechanism, to ensure it is fully constrained when the sliders are set to specific positions:

$$M = b(N - 1 - j) + \sum_{i=1}^{j} f_i \quad (1)$$

where M is the mobility, b=6 for spatial mechanisms, N is the number of four-bar elements including ground, j is the number of joints, and $f_i$ is the degrees of freedom of the i'th joint. For the proposed design, the ground, three vertical sliders, three arms, and the platform make up N=8 elements. The number of joints includes three radially symmetric sets of a prismatic, spherical, and revolute joints with $f_p=1$, $f_s=3$, and $f_r=1$, respectively, for a total of j=9. Thus, Eq. (1) results in the desired mobility, M, of three degrees of freedom.

Figure 2:
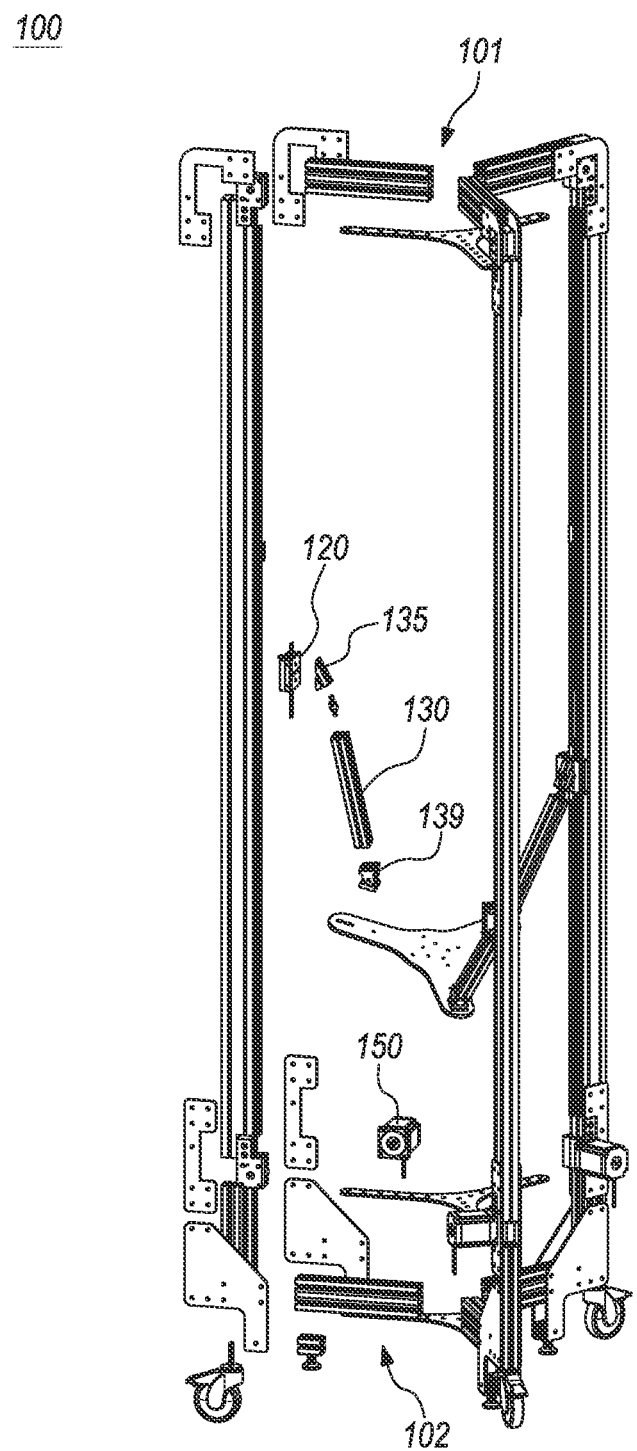
FIG. 2 illustrates the device of FIG. 1 with a portion of the device in an exploded view.

FIG. 1 illustrates an embodiment of the 3DOF mechanism (device) 100 including a frame comprising a plurality of rails 110, each rail including a slider 120. Rails 110 may be configured as a radially symmetric set as shown. A first rail support member 101 may be connected to a first end of the plurality of rails 110, and a second rail support member 102 may be connected to a second end (opposite the first end) of the plurality of rails 110. As shown in the exploded view of FIG. 2, each of the rail support members may include a plurality of components arranged substantially similarly and including: a plurality of frame brackets that connect rails 110 to a given rail support member, a plurality of support beams, and a plurality of support plates that may have radial symmetry in keeping with device 100, Caster wheels and feet/footings may also be connected to a side of one of the rail support members to promote mobility and stability of device 100.

In FIG. 1, section 170 of device 100 is an enlarged view of certain components of device 100 for ease of viewing. A plurality of arms 130 may be disposed within the frame and on the rails 110. Each arm 130 may include a ball joint 135 at one end connected to one of the sliders 120, as well as a hinge joint 139 located at another end (opposite the one end) and connected to a platform 140. Platform 140 may be configured to roll and pitch within the frame via changing positions of sliders 120 along rails 110. Heave of platform 140 may be controlled by actuating sliders 120 in a same direction concurrently.

Device 100 may further comprise a plurality of motors 150 (see FIG. 2), each motor 150 connected to one of the sliders 120. Motors 150 are configured to actuate the sliders 120 along the rails 110. A controller 160 (not shown) may be connected to the motors 150 and configured to communicate with the motors 150 to implement a path model within a roll-pitch configuration space. The roll-pitch configuration space is configured to minimize kinematic lock and to eliminate disjoint regions based on parameters including any/all of: the ranges of motion of ball joints 135 and hinge joints 139, the dimensions of the platform 140, length of arms 130, and radius of device 100.

The path model may employ one of various approaches including a forward kinematic approach, an inverse kinematic approach, and an empirical approach.

The forward kinematic approach may utilize a lookup table (LUT) and 3-axis interpolation. The LUT provides a grid of location points for all possible combinations of slider heights for replicating wave motion, and the location points can be solved a priori. The forward kinematic approach may then utilize 3-axis interpolation, wherein selected roll and pitch of the platform are used to determine spatial coordinates of platform 140 and sliders 120. The empirical approach may be used to develop a LUT based on testing the 3DOF mechanism. Further discussion of each of the approaches mentioned above will be provided in the Experimental Results section of this detailed description.

Device 200 (shown in FIGS. 10A & 10B) is an embodiment that may utilize a counterweight 180 disposed on each rail 110 on a side opposite the side having the slider 120. Other portions of device 200 that are substantially similar to device 100 shown in FIGS. 1-2 may not be further described. Counterweight 180 is configured to move in an opposite direction from the direction of slider 120 when it is actuated along the rail. In this manner, counterweight 180 enables a balanced load that reduces stress to motors 150 and makes the lifting of the load more efficient by offsetting the weight of sliders 120.

In various embodiments, actuating sliders 120 may include utilizing mechanisms connected to the motors 150. Examples of mechanisms that may be employed on each rail 110 and connected to a respective motor 150 are: a lead screw, a ball screw, a linear actuator, a piston, and a belt connected to a plurality of pulleys. FIG. 10B shows a belt 115 connected to a plurality of pulleys 116 and slider 120. Belt 115 may be connected to slider 120 (and counterweight 180 if present in an embodiment). Belt 115 is configured to enable slider 120 (and counterweight 180 if present) to be actuated along the largest dimension of rail 110. Other mechanisms beyond the examples provided may be apparent to a person having ordinary skill in the art and implemented to achieve the function of actuating sliders 120.

Figure 3:
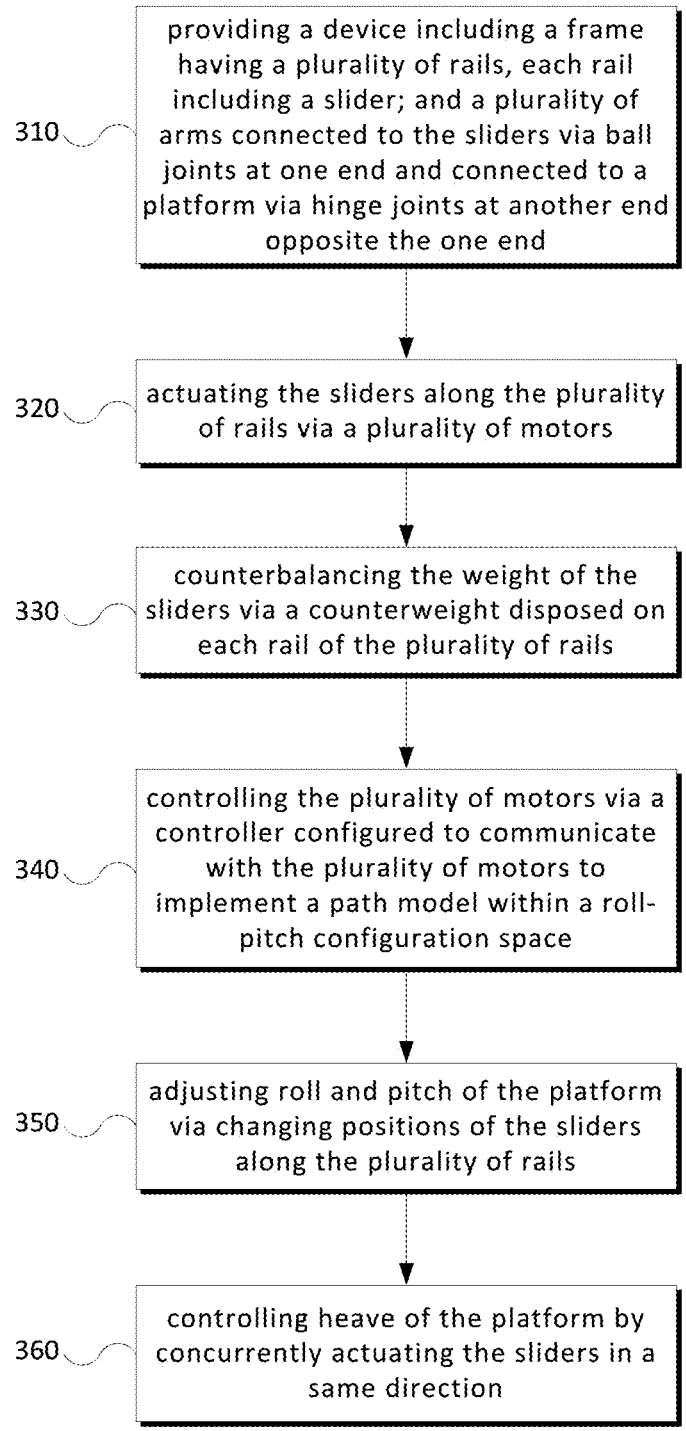
FIG. 3 is a flowchart of an embodiment of a method in keeping with the device for replicating wave motion.

FIG. 3 illustrates a flowchart of an embodiment of a method 300 in keeping with the device and method for replicating wave motion. Some of the steps of method 300 may be implemented as modules stored within a non-transitory computer-readable medium, wherein the steps are represented by computer-readable programming code. For illustrative purposes, method 300 may be discussed with reference to various other figures. Additionally, while FIG. 3 shows an embodiment of method 300, other embodiments of method 300 may contain fewer or additional steps. Although in some embodiments the steps of method 300 may be performed as shown in FIG. 3, in other embodiments the steps may be performed in a different order, or certain steps may occur simultaneously with one or more other steps.

Method 300 may begin with step 310, which includes providing a device including a frame having a plurality of rails, each rail including a slider; and a plurality of arms connected to the sliders via ball joints at one end and connected to a platform via hinge joints at another end opposite the one end. In some embodiments, the plurality of rails is configured as a radially symmetric set.

Step 320 may include actuating sliders 120 along the plurality of rails 110 via the plurality of motors 150. Actuating sliders 120 may further comprise utilizing a plurality of mechanisms, each mechanism connected to one of the plurality of motors and configured to actuate the slider, and wherein each mechanism is chosen from at least one of: a plurality of pulleys connected to a belt, wherein the belt is connected to the slider; a lead screw; a ball screw, a linear actuator; and a piston.

Step 330 may include counterbalancing the weight of sliders 120 via counterweights 180 (shown in FIGS. 10A & 10B) disposed on each rail 110 on a side opposite slider 120 and configured to move in an opposite direction from slider 120 when it is actuated along rail 110.

Step 340 may include controlling motors 150 via a controller 160 (not shown) configured to communicate with motors 150 to implement a path model within a roll-pitch configuration space. The path model may employ an approach chosen from at least one of: a forward kinematic approach; an inverse kinematic approach; and an empirical approach. In some embodiments, the roll-pitch configuration space does not have disjoint regions and is configured to minimize kinematic lock based on parameters including at least three of: ranges of motion for the hinges and the ball joints; platform dimensions; length of the arms; and radius of the device.

In some embodiments, the forward kinematic approach comprises utilizing a LUT and 3-axis interpolation, wherein the LUT provides a grid of locations points for all possible combinations of slider heights, and wherein the 3-axis interpolation is utilized to determine spatial coordinates of the platform and the sliders based on the LUT and selected roll and pitch of the platform.

Step 350 may include adjusting roll and pitch of platform 140 via changing positions of sliders 120 along rails 110.

Step 360 may include controlling heave of platform 140 by concurrently actuating sliders 120 in a same direction.

The path model implemented using the controller may be capable of specifying the roll, pitch, and heave to simulate sea states up to and including sea state four.

Experimental Results

It should be understood by a person having ordinary skill in the art that the experimental results provided herein are examples in keeping with the subject matter of the present disclosure. No language regarding experimental results should be seen as controlling or limiting with respect to the subject matter of the present disclosure and the appended claims.

An experimental prototype was developed using T-slotted extruded aluminum for the frame. The frame was fabricated large enough to replicate wave conditions up to sea state four, which is 1.25-2.5 m heave with a 5-15 second period. The vertical rails used a geared belt system (although other alternative mechanisms could be used). A microcontroller based off the Arduino ATMEGA 2560 was used to communicate with the motors. Nema 34 stepper motors with a maximum torque of 8.5 N-m, enough to carry a 15 kg payload, were used; however, alternative motors could be used such as DC motors, etc. Large stepper motor drivers capable of 10 A at 80V were used to fully exploit the torque range of the motors. Custom firmware was developed to command motor steps per clock cycle, running at 10 Hz. Table I lists the hardware used for the prototype.

TABLE I

Prototype Hardware

| Hardware | Supplier | Part Number |
| --- | --- | --- |
| Linear Rails | MiniTec | LR6 Z90 |
| Stepper Motor | Anaheim Automation | 34Y214S-LWS |
| Motor Driver | Anaheim Automation | MBC10641 |
| Micro-Controller | Azteeg | X3 |
| Power Supply | B&K Precision | 9117 |
| Ball Joint | Mcmaster | S412K120 |
| Hinge | MiniTec | 21.2020 |
| Firmware | Custom | — |

The inverse kinematic approach includes specifying the desired roll, pitch, and height of the platform and solving for the slider heights. Specifying the pose of the platform by using roll and pitch angles requires the use of a rotation matrix involving sine and cosine for the unknown yaw angle. To then solve for the slider heights results in a system of nonlinear equations that requires solving for yaw. A forward kinematic approach of specifying the slider heights may be used to solve for the spatial coordinates of the platform, and the associated pose. All possible slider heights are solved deductively to build a LUT. For path generation, the desired roll and pitch is then specified using a 3-axis interpolation as part of an empirical approach. Heave is specified directly by actuating all three sliders concurrently.

Figure 4:
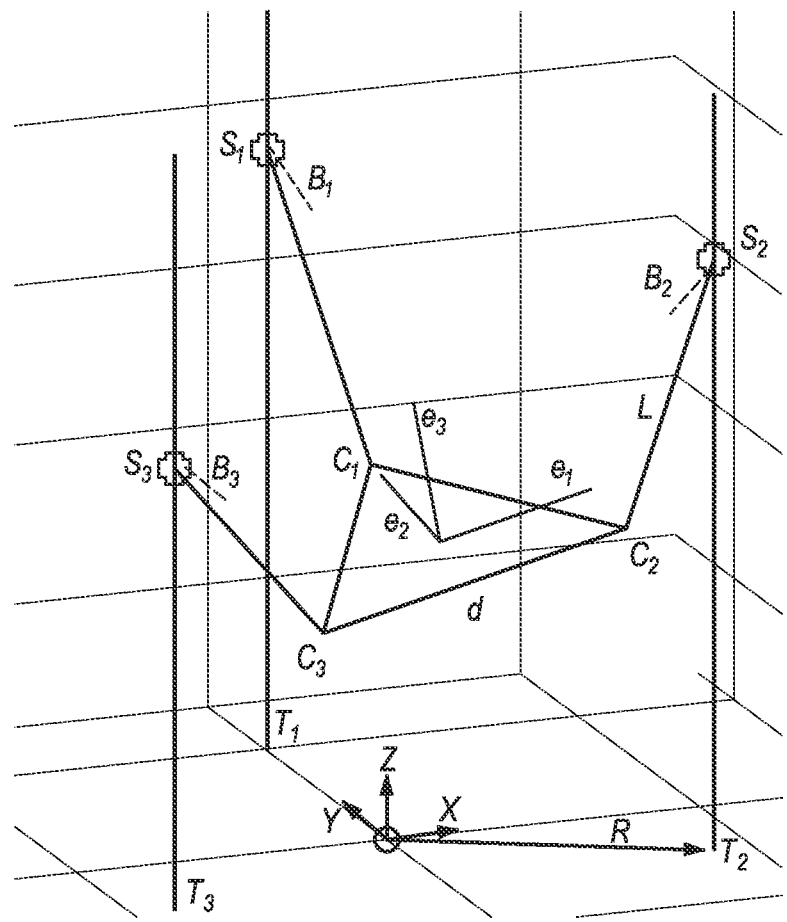
FIG. 4 illustrates a schematic geometry of the device in keeping with an embodiment.

FIG. 4 illustrates a schematic geometry of the device according to an embodiment. The spatial coordinates of the corners of the platform can be solved given specific slider heights using geometric and hinge constraint equations for each of the three rails/towers. The geometry of the arms do not change, constraining the slider and platform corner to a specific length:

$$\vec{SC}_{i,i} = \|S_i - C_i\| = L \quad (2)$$

where $S_i$ are the coordinates of the slider for the i'th tower, and $C_i$ are the coordinates of the i'th corner of the platform attached to the arm, and L is the constant length of the arm.

A similar geometric constraint equation specifies the size of the platform:

$$\vec{CC}_{i,i+1} = \|C_i - C_{i+1}\| = d \quad (3)$$

where $C_i$ are the coordinates for the i'th corner of the platform, $C_{i+1}$ are the coordinates of one of the other corner of the platform, and d is the edge length of the equilateral shaped platform.

The constraint of the hinge joint can be calculated using Eq. (4). The arm, or vector from the slider to the corner of the platform is constrained to be perpendicular to the back edge of the platform. When perpendicular, the dot product of these vectors is zero:

$$\vec{SC}_{i,i} \cdot \vec{CC}_{i+1,i+2} = 0 \quad (4)$$

where $S_i$ are the coordinates of the slider for the i'th tower, $C_i$, $C_{i+1}$ and $C_{i+2}$ are the coordinates of the corners of the platform.

Combining Eq. (2) through Eq. (4) for each of the three towers leads to a system of nine equations with nine unknowns—the $X_i$, $Y_i$, and $Z_i$ coordinates of the three platform corners. This set of equations can then be solved numerically for any given set of slider heights.

Knowing the $X_i$, $Y_i$, and $Z_i$ locations of the three corners of the platform, the location of the center of mass (COM), the roll, pitch, yaw, hinge, and ball joint angles can be determined.

The COM is found from the mean of the $X_i$, $Y_i$, and $Z_i$ coordinates of the corners. The coupled surge, sway, and heave of the platform correspond to the change in COM coordinates. Heave can be changed by adjusting all three sliders according to the Z-coordinate of the COM.

The body coordinate vectors, $\vec{e}_1$, $\vec{e}_2$, $\vec{e}_3$ define an affine rotation matrix from a unit length coordinate system centered at the origin in the direction of the world coordinates. The platform normal vector is found from the normalized cross product of two of the edges:

$$\vec{e}_3 = \frac{\vec{C}_{1,3} \times \vec{C}_{1,2}}{\|\vec{C}_{1,3} \times \vec{C}_{1,2}\|} \quad (5)$$

where $\vec{C}_{i,j}$ is the vector from the i'th corner to the j'th corner. The remaining platform body coordinate vectors are found from the normalized vector between corner 1 and the COM, and the cross-product of $\vec{e}_2$ and $\vec{e}_3$:

$$\vec{e}_2 = \frac{\vec{C}_{1,COM}}{\|\vec{C}_{1,COM}\|} \quad (6)$$

$$\vec{e}_1 = \vec{e}_2 \times \vec{e}_3 \quad (7)$$

where $\vec{C}_{i,COM}$ is the vector from the i'th corner to the COM.

The roll, pitch, and yaw angles can be determined from three separate entries of the 1-2-3 Tait Bryan rotation matrix:

$$\phi = \arcsin(\vec{e}_3(1)) \quad (8)$$

$$\theta = \arcsin\left(\frac{\vec{e}_3(2)}{-\cos(\phi)}\right) \quad (9)$$

$$\psi = \arcsin\left(\frac{\vec{e}_2(1)}{-\cos(\phi)}\right) \quad (10)$$

where $\phi$ is roll, $\theta$ is pitch, $\psi$ is yaw, and $\vec{e}_i(1)$ and $\vec{e}_i(2)$ correspond to the first and second entry of the respective vector.

The i'th hinge angle, $\delta_i$, is found from the dot product of the arm vector with the vector from the respective corner to the COM:

$$\delta_i = \arccos\left(\frac{\vec{C}_{i,COM} \cdot \vec{SC}_{i,i}}{\|\vec{C}_{i,COM}\|L}\right) \quad (11)$$

where $\vec{C}_{i,COM}$ is the vector from the i'th corner to the COM, $\vec{SC}_{i,i}$ the i'th arm vector, and L the arm length.

The i'th ball joint angle, $\beta_i$, is found from the dot product between the arm vector and the mounting axis as:

$$\beta_i = \arccos\left(\frac{\vec{SC}_{i,i} \cdot \vec{B}_i}{L}\right) \quad (12)$$

where $\vec{SC}_{i,i}$ is the i'th arm vector, L the arm length, and $\vec{B}_i$ is the mounting axis of the ball joint defined by:

$$\vec{B}_i = R(\gamma)\vec{T}_i \quad (13)$$

where $\gamma$ is the ball joint mounting angle, and $\vec{T}_i$ is the vector from the origin to the base of the tower. R ($\gamma$) is defined by a rotation matrix to rotate the vector down by the ball joint mounting axis angle:

$$R(\gamma) = \begin{bmatrix} 1 & 0 & 0 \\ 0 & \cos(\gamma) & -\sin(\gamma) \\ 0 & \sin(\gamma) & \cos(\gamma) \end{bmatrix} \quad (14)$$

The forward kinematic approach (utilizing a LUT and 3-axis interpolation) was used for the roll-pitch configuration space. To develop the LUT, all possible combinations of relative slider heights were simulated a priori, requiring a numerically intensive approach. 3-axis interpolation was leveraged to determine exact points in the configuration space after the LUT was generated, thereby providing greater accuracy concerning specifying an exact position of each slider.

The empirical approach for developing a LUT involves commanding the slider heights to specified locations and measuring the roll/pitch of the platform (with an inertial measurement unit). Repeating these steps will build the LUT/configuration space.

To build the LUT, keeping the geometric design parameters at a nominal, non-dimensional length; the tower radius, R=1, arm length, L=1, and platform edge length d=1, the slider heights can be simulated proportionally. For each combination of slider heights, the forward kinematic equations can be solved numerically with Eq. (2), Eq. (3), and Eq. (4), using the tower base coordinates as initial conditions. When a numerical solution is found, the roll and pitch angles can be calculated using Eq. (8) and Eq. (9). To capture the entire configuration space, the first slider was kept at a height of 2.5R, and the other two ranged from 0 to 5R in 200 increments.

Two geometric constraints were applied to determine the configuration space. First, the platform must physically stay within the towers, which can be imposed by keeping solutions where the arm vectors are not parallel with the towers. This can be imposed by enforcing a dot product to be less than 0:

$$\vec{SC}_{i,i} \cdot \vec{T}_i \leq 0 \quad (15)$$

where $\vec{SC}_{i,i}$ is the i'th arm vector and $\vec{T}_i$ is the unit vector from the origin to the base of the i'th tower. Second, the hinge mounted on top of the platform has a range of 0-180° (as the arm cannot rotate through the platform). This can also be imposed by enforcing a dot product to be less than 0:

$$\vec{SC}_{i,i} \cdot \vec{e}_3 \leq 0 \quad (16)$$

where $\vec{SC}_{i,i}$ is the i'th arm vector and $\vec{e}_3$ is the normal defined in Eq. (5).

Figure 6A:
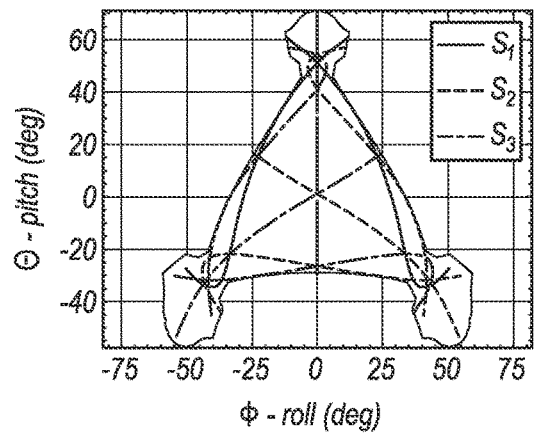
FIGS. 6A-6D illustrate design parameters of a configuration space for the device in keeping with an embodiment.
Figure 6B:
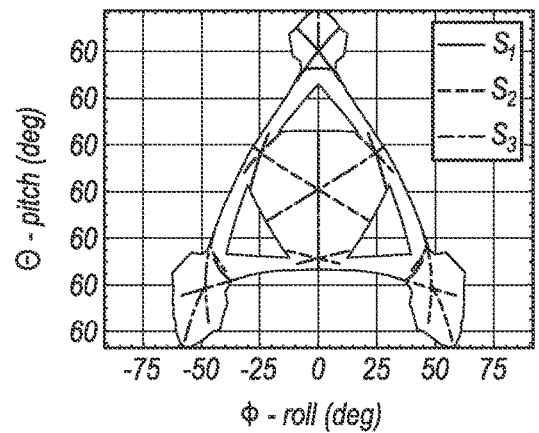
Figure 6C:
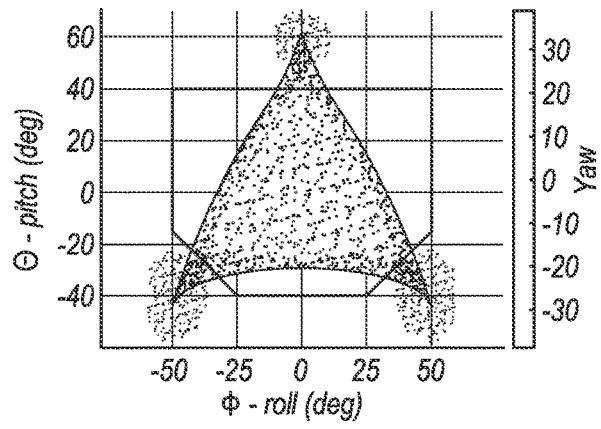

The configuration space for the nominal parameters is shown in FIG. 6A. As the design is symmetric across the Y-Z plane, the configuration space is also symmetric across the φ=0 axis. The regions of kinematic lock near the boundaries and corners of the regions indicate where the slider curves wrap back in on themselves. This corresponds to an extreme, non-holonomic platform orientation that can only be achieved after a specified set of slider movements. More specifically, the yaw coupling, as shown in FIG. 6C, is different for the same roll and pitch combinations in these regions. Another design parameter set configuration space is shown in FIG. 6B. Imposing the geometric constraints can potentially leave holes in the configuration space. These regions represent where the platform would have to travel outside the towers, or the hinge would rotate past 180° and potentially invert the platform.

Yaw has the largest coupling at the extreme roll angles and regions where the platform is kinematically locked. The coupling of the two uncontrollable translation degrees of freedom have similar results. Surge is symmetric across the φ=0 axis, while sway is inversely symmetric across the same axis. The maximum coupling displacement is ~50% of the nominal scale. For this application, the heave motion is significantly greater than the nominal scale, and errors from the yaw, surge and sway coupling are negligible.

A parameter study included varying L and d relative to R from 50% to 150% in 2.5% increments. For each parameter combination, a LUT was created, and the area of the boundary of the configuration space was calculated. The parameter sets with disjointed configuration spaces were discarded in order to account for the geometric constraints.

regions, as seen by the red polygon shown in FIG. 6C. The area of the intersected polygon with the corners removed was then calculated for all parameter combinations and the maximum found.

The ball joint used in the prototype is capable of 30° in all directions. The nominal angle at which the ball joint is mounted was optimized. For each parameter set in the nominal optimization, the ball joint axis angle, γ, was varied from 30°-45° in 1° increments. The area of the resulting configuration space was calculated such that every $β_i$ within the configuration space was less than the physical limit of the ball joint. The ball joint mounting angle optimization was performed over all parameter sets.

The scale of this optimization resulted in ~70 million numerical solves of the system of nine equations, which may be computationally intensive. Optimization was performed on a supercomputer, running 41 possible combinations of the arm length parameter, L, in parallel. Table II shows six parameter configurations, wherein three configurations have almost identical area values as their parameters increase proportionally together.

TABLE II

| | CONFIGURATION SPACE PARAMETERS | | | | | |
|---|---|---|---|---|---|---|
| | 1 | 2 | 3 | 4 | 5 | 6 |
| Area (°)² | 4615.6 | 4613.9 | 4613.8 | 4551.9 | 4547.1 | 4543.1 |
| L | 0.975 | 1.0 | 1.025 | 0.85 | 0.825 | 0.875 |
| d | 1.175 | 1.15 | 1.125 | 1.325 | 1.35 | 1.30 |

Figure 6D:
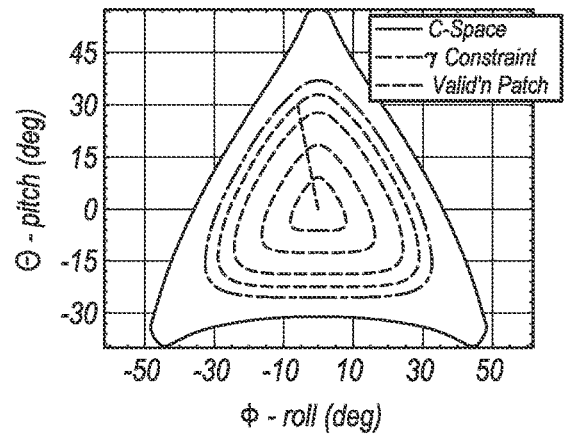

The configuration space for both the nominal optimization and the ball joint mounting angle optimization are shown in FIG. 6D. The regions of kinematic lock have been minimized, and there are no disjoint regions. The region for the ball joint constraint is significantly smaller. Table III shows six parameter configurations given the ball joint angle constraint. The areas represent ~60% of the overall configuration space. The ball joint constraint leaves a configuration space well within the region of kinematic lock.

TABLE III

| | CONFIGURATION SPACE PARAMETERS GIVEN THE BALL JOINT CONSTRAINT | | | | | |
|---|---|---|---|---|---|---|
| | 1 | 2 | 3 | 4 | 5 | 6 |
| Area (°)² | 2816.5 | 2813.9 | 2812.7 | 2811.5 | 2809.2 | 2805.1 |
| L | 0.975 | 1.0 | 1.0 | 0.95 | 1.0 | 1.0 |
| d | 1.15 | 1.075 | 1.125 | 1.075 | 1.05 | 1.1 |
| Y (°) | 30 | 32 | 30 | 34 | 33 | 31 |

The regions of kinematic lock at the corners of the configuration space were reduced by setting the hinge angle range to 0-150°, which were enforced by normalizing Eq. (16) and limiting the dot product to be less than 0.5:

$$\frac{\vec{SC}_{i,i} \cdot \vec{e}_3}{\|\vec{SC}_{i,i}\|} \leq .5 \quad (17)$$

To further remove the regions of kinematic lock from the optimization, the boundary of the configuration space was intersected with a polygon which removes the corner Generating a path through the configuration space for simulation and experimentation may be accomplished using a high fidelity model with ~1000 increments between the minimum and maximum slider heights. Such a model results in ~0.1° resolution. The model with only 200 increments had a lower resolution of ~1°. With the high fidelity model, the error between the desired roll and pitch combination and the nearest data point is ≤0.05°, which is negligible. For more accuracy, an approach utilizing 3-axis interpolation is beneficial to describe a desired path through the configuration space based on the roll and pitch, rather than slider height. Given a desired roll and pitch combination, the nearest data point in the configuration space is determined (see FIG. 11).

Figure 11:
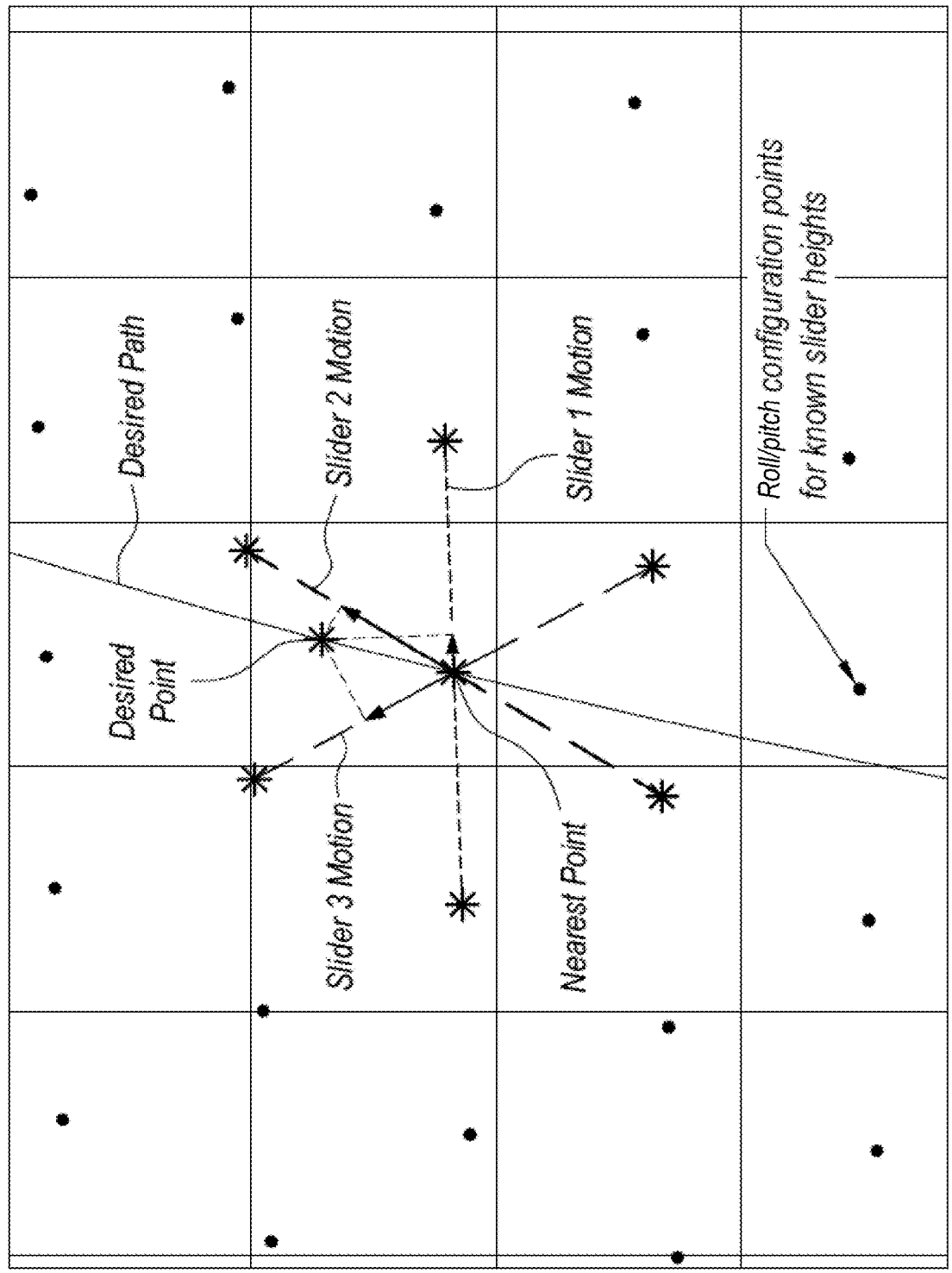
FIG. 11 shows an example of platform motion through a path in a configuration space in keeping with an embodiment.

The example provided in FIG. 11 illustrates that motion along a desired path in the roll-pitch configuration space includes determining the path of motion for each slider from a nearest point to a desired point, wherein each point is a roll/pitch configuration point for known slider heights along the rails. The component of the error in the direction of the neighboring points can be determined through a dot product and added to the nearest point.

In order to validate the parameters and the configuration space, a path through the space was created and tested. Specifically, the ball joint constraint boundary was offset and set as the desired path, as seen by the connected level sets path shown in FIG. 6D. The 3-axis interpolation of the configuration space process determined the commanded slider heights. A simulation was used to validate the commanded heights prior to testing. Since the firmware specifies motor steps per clock cycle, the desired path through the configuration space was numerically differentiated, which was accomplished with a central difference method.

An ocean numerical simulator was used for generating wave data. It utilized the Phillips spectrum, based on a pseudo-random Gaussian wave distribution of the wave field vector. Specifically, wind speed, wind direction and wave surface roughness were specified to represent sea states 1-4. The numerical simulator can also be modified to utilize different wave spectra suited for other wave conditions. FIGS. 7A and 7B show the numerical simulator along with the specified heave profile, respectively.

Simulating boat/vessel motion on turbulent waves, or converting known ocean wave motion to boat motion is achieved by assuming the orientation of the vessel is fixed to three separate points on the wave surface, thereby making a plane. From this plane, the specified roll, pitch, and heave can be determined using calculations similar to Eq. (8) and (9).

Figure 5A:
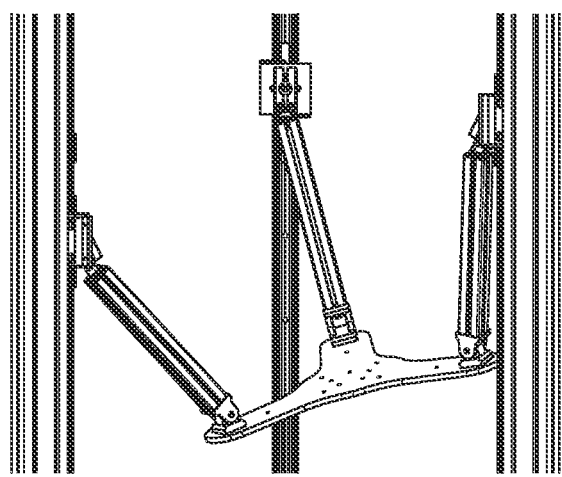
FIGS. 5A & 5B show testing and simulation of a pose of the device in keeping with an embodiment.
Figure 5B:
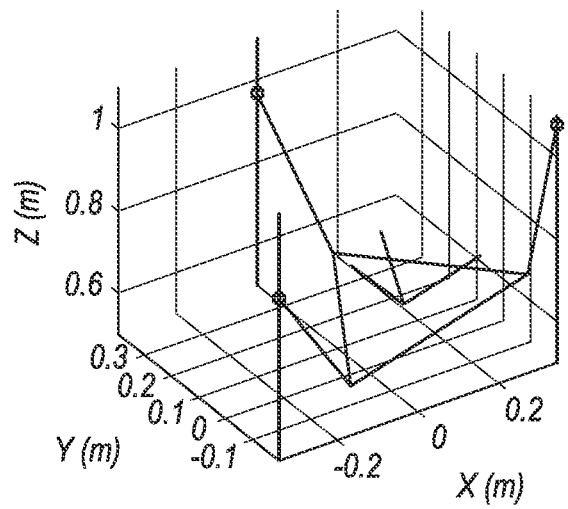

With the parameters determined as described above, the prototype was scaled up to the minimum size to accommodate a UAV winch payload, resulting in R=0.40 m, d=0.46 m, and L=0.39 m. FIGS. 5A and 5B show the prototype during testing and the simulation showing the same pose, respectively.

The configuration space was validated using an inertial measurement unit (IMU) mounted at the center of mass of the platform. FIG. 8 shows the results from the boundary level set path through the ball joint constrained configuration space.

The commanded height of the sliders was adjusted such that the COM had no commanded heave. After adjusting for the initialization offset and starting time, the IMU coincides with the commanded path effectively. The average error for roll and pitch was 1.2° with a standard deviation of 2.8°. Yaw was also commanded as it was coupled, but it remained below 5°.

FIG. 9 shows the test results from one trial using the numerical wave data as the input. Again, the roll and pitch are seen to follow the commanded paths. The average error for roll and pitch was 1.2°, and standard deviation was 3.10. At slower speeds the effects of rounding the commanded speed to integers for stepper motor control may cause errors in pitch (see e.g., around 20 and 50 seconds). Vibrations from the stepper motors at slower speeds may also add to the error.

For a coordinated UAV-USV scenario, the significant motion to reproduce includes roll, pitch, and heave. Sway, surge, and yaw may be considered negligible. By using a 3DOF mechanism having linear guides to achieve a desired heave range, the 3DOF mechanism requires fewer actuators at a lower cost compared to a similarly designed Stewart platform, while maintaining the primary degrees of freedom for wave replication.

The use of any examples, or example language ("e.g.," "such as," etc.), provided in the present disclosure are merely intended to better illuminate and are not intended to pose a limitation on the scope of the subject matter unless otherwise claimed. No language in the present disclosure should be construed as indicating that any non-claimed element is essential.

Many modifications and variations of the present disclosure are possible in light of the above description. Within the scope of the appended claims, the embodiments described herein may be practiced otherwise than as specifically described. The scope of the claims is not limited to the disclosed implementations and embodiments but extends to other implementations and embodiments as may be contemplated by those having ordinary skill in the art.

What is claimed is:

1. A wave motion replicator comprising:
a frame comprising:
a plurality of rails, each rail including a slider, wherein the plurality of rails is configured as a radially symmetric set, wherein a length of each rail is greater than four times a radius of the frame;
a first rail support member connected to a first end of the plurality of rails; and
a second rail support member connected to a second end of the plurality of rails, wherein the second end is opposite the first end; and
a platform connected to the frame via a plurality of arms, wherein each arm includes a ball joint at one end connected to one of the sliders, and wherein each arm includes another end opposite the one end and connected to the platform via a hinge joint,
wherein the platform is configured to roll and pitch via changing positions of the sliders along the plurality of rails; and
a plurality of motors each connected to one of the sliders and configured to actuate the sliders along the plurality of rails; and
a controller communicatively coupled to the plurality of motors and configured to cause each of the sliders to move along their respective rails such that the platform replicates motion of a vessel on a surface of an ocean.

2. The wave motion replicator of claim 1, wherein the wave motion replicator is capable of vertically displacing the platform up to 2.5 meters and replicating vessel motion in varying ocean conditions up to and including sea state four.

3. The wave motion replicator of claim 2, wherein actuating the sliders further comprises utilizing a plurality of mechanisms, each mechanism connected to one of the plurality of motors and configured to actuate the slider, and
wherein each mechanism is chosen from at least one of:
a plurality of pulleys connected to a belt, wherein the belt is connected to the slider; a lead screw; a ball screw, a linear actuator; and a piston.

4. The wave motion replicator of claim 1, wherein each rail of the plurality of rails includes a counterweight disposed on a side of the rail opposite the slider and configured to move in an opposite direction from the slider when it is actuated along the rail.

5. The wave motion replicator of claim 1, further comprising a plurality of mechanisms, each mechanism connected to one of the plurality of motors and configured to actuate the slider, wherein each mechanism is chosen from at least one of: a plurality of pulleys connected to a belt, wherein the belt is connected to the slider; a lead screw; a ball screw, a linear actuator; and a piston.

6. The wave motion replicator of claim 1, wherein the controller is configured to communicate with the plurality of motors to implement a platform path model within a roll-pitch configuration space that involves a forward kinematic approach which comprises utilizing a lookup table (LUT) and 3-axis interpolation,
wherein the LUT provides a grid of locations points for all possible combinations of slider heights, and
wherein the 3-axis interpolation is utilized to determine spatial coordinates of the platform and the sliders based on the LUT and selected roll and pitch of the platform.

7. The wave motion replicator of claim 1, wherein heave of the platform is controlled by concurrently actuating the sliders in a same direction.

8. A wave motion replicator comprising:
a frame comprising:
a plurality of rails, each rail including a slider;
a first rail support member connected to a first end of the plurality of rails; and
a second rail support member connected to a second end of the plurality of rails, wherein the second end is opposite the first end; and
a platform connected to the frame via a plurality of arms, wherein each arm includes a ball joint at one end connected to one of the sliders, and wherein each arm includes another end opposite the one end and connected to the platform via a hinge joint, wherein the platform is configured to roll and pitch via changing positions of the sliders along the plurality of rails;
a plurality of motors each connected to one of the sliders and configured to actuate the sliders along the plurality of rails;
a controller communicatively coupled to the plurality of motors and configured to cause each of the sliders to move along their respective rails such that the platform replicates motion of a vessel on a surface of an ocean; and
a UAV tether winch connected to the platform.

9. A wave motion replicator comprising:
a frame comprising:
a plurality of rails, each rail including a slider;
a first rail support member connected to a first end of the plurality of rails; and
a second rail support member connected to a second end of the plurality of rails, wherein the second end is opposite the first end; and
a platform connected to the frame via a plurality of arms, wherein each arm includes a ball joint at one end connected to one of the sliders, and wherein each arm includes another end opposite the one end and connected to the platform via a hinge joint, wherein the platform is configured to roll and pitch via changing positions of the sliders along the plurality of rails;
a plurality of motors each connected to one of the sliders and configured to actuate the sliders along the plurality of rails;
a controller communicatively coupled to the plurality of motors and configured to cause each of the sliders to move along their respective rails such that the platform replicates motion of a vessel on a surface of an ocean, wherein the controller is configured to minimize kinematic lock by not allowing any hinge joint to have a hinge angle greater than 150°.

10. A method for replicating ocean wave motion comprising:
providing a device including a frame having a plurality of rails, each rail including a slider; and a plurality of arms connected to the sliders via ball joints at one end and connected to a platform via hinge joints at another end opposite the one end, wherein the plurality of rails is configured as a radially symmetric set, wherein a length of each rail is greater than four times a radius of the frame;
actuating the sliders along the plurality of rails via a plurality of motors; and
adjusting roll and pitch of the platform via changing positions of the sliders along the plurality of rails such that the platform replicates motion of a vessel on a surface of an ocean.

11. The method of claim 10, further comprising:
controlling the plurality of motors via a controller configured to communicate with the plurality of motors to implement a path model within a roll-pitch configuration space.

12. The method of claim 11, wherein the path model employs a forward kinematic approach.

13. The method of claim 12, wherein the forward kinematic approach comprises utilizing a lookup table (LUT) and 3-axis interpolation,
wherein the LUT provides a grid of locations points for all possible combinations of slider heights, and
wherein the 3-axis interpolation is utilized to determine spatial coordinates of the platform and the sliders based on the LUT and selected roll and pitch of the platform.

14. The method of claim 13, wherein the path model implemented using the controller is capable of specifying the roll, pitch, and heave to simulate sea states up to and including sea state four.

15. The method of claim 10, further comprising:
counterbalancing the weight of the sliders via a counterweight disposed on each rail of the plurality of rails on a side opposite the slider and configured to move in an opposite direction from the slider when it is actuated along the rail.

16. The method of claim 10, further comprising:
controlling heave of the platform by concurrently actuating the sliders in a same direction.

17. A method for replicating ocean wave motion comprising:
providing a device including a frame having a plurality of rails, each rail including a slider; and a plurality of arms connected to the sliders via ball joints at one end and connected to a platform via hinge joints at another end opposite the one end;
actuating the sliders along the plurality of rails via a plurality of motors;
controlling the plurality of motors via a controller configured to communicate with the plurality of motors to implement a path model within a roll-pitch configuration space;
adjusting roll and pitch of the platform via changing positions of the sliders along the plurality of rails such that the platform replicates motion of a vessel on a surface of an ocean, wherein the roll-pitch configuration space does not have disjoint regions and is configured to minimize kinematic lock by not allowing any hinge joint to have a hinge angle greater than 150°.

* * * * *